United States Patent [19]
Tomita et al.

[11] Patent Number: 5,967,745
[45] Date of Patent: Oct. 19, 1999

[54] GAS TURBINE SHROUD AND PLATFORM SEAL SYSTEM

[75] Inventors: Yasuoki Tomita; Hiroki Fukuno; Eisaku Ito; Kiyoshi Suenaga, all of Takasago, Japan

[73] Assignee: Mitsubishi Heavy Industries, Ltd., Tokyo, Japan

[21] Appl. No.: 09/028,662

[22] Filed: Feb. 24, 1998

[30] Foreign Application Priority Data

Mar. 18, 1997 [JP] Japan ................................ 9-064452

[51] Int. Cl.⁶ .................................................. F01D 11/02
[52] U.S. Cl. .................................. 415/173.7; 415/174.4; 415/174.5
[58] Field of Search .................... 415/115, 116, 415/173.1, 173.4, 173.5, 173.7, 174.4, 174.5; 60/39.75

[56] References Cited

U.S. PATENT DOCUMENTS

| | | | |
|---|---|---|---|
| 4,507,052 | 3/1985 | Thompson | 415/173.7 |
| 4,820,119 | 4/1989 | Joyce | 415/173.7 |
| 5,313,786 | 5/1994 | Chlus et al. | 60/39.75 |
| 5,522,698 | 6/1996 | Butler et al. | 415/174.5 |
| 5,555,721 | 9/1996 | Bourneuf et al. | 60/39.75 |

FOREIGN PATENT DOCUMENTS

| | | | |
|---|---|---|---|
| 62558 | 10/1982 | European Pat. Off. | 415/115 |
| 6-159099 | 6/1994 | Japan | 415/173.1 |

*Primary Examiner*—Christopher Verdier
*Attorney, Agent, or Firm*—Wenderoth, Lind & Ponack, L.L.P.

[57] ABSTRACT

A gas turbine shroud and platform seal system, which is constructed so that the flow of sealing air does not disturb a combustion gas flow, and thus any aerodynamic loss is reduced. The leaking air (60) leaks from between a platform (2) of moving blade (1) and an inside shroud (12) in a stationary blade (11). At a front or upstream side of the moving blade (1), the leaking air (60) flows along a S-shaped path within a space (8, 17) formed by a projecting end portion (12b) of the shroud, a honeycomb seal (14) and a projecting portion (4) of the platform. The air eventually flows out in the same flow direction as that of the combustion gas (50) along a surface of the platform (2). At a rear side of the moving blade (1), the leaking air (60) flows along an S-shaped path within a space (6, 9) formed by a projecting end portion (2b) of the platform, a projecting end portion (12b) of the shroud, a honeycomb seal (13) and a seal plate (3). The air eventually flows out in the same direction as that of the combustion gas (50) along a surface of the shroud (12). The air (60) flows in the same direction as the combustion gas (50), and thus a flow loss is reduced. Also, the air is not easily leaked, and a cooling effect of the platform and the shroud is increased due to a film cooling effect.

4 Claims, 4 Drawing Sheets

GAS TURBINE SHROUD AND PLATFORM SEAL SYSTEM

BACKGROUND OF THE INVENTION

1. Field of the Invention

The present invention relates to a gas turbine seal system between a stationary blade shroud and an adjacent moving blade platform.

2. Description of the Related Art

FIG. 4 is a cross sectional view which shows an arrangement of a stationary blade and a moving blade in a conventional gas turbine. In the drawing, reference numeral 21 denotes a moving blade, and reference numeral 31 denotes a stationary blade. The moving blade 21 has a platform 22 in a base portion, and is alternately mounted to a rotor with the stationary blade 31 being disposed therebetween. Also, car the moving blades are rotated by a flow of a combustion gas 50. Reference numeral 23 denotes a seal plate provided at the front and rear of a lower portion of the 19 platform 22, and reference numerals 24 and 25 denote a front end portion and a rear end portion, respectively, of the platform 22.

Reference numeral 32 denotes an inside shroud of the stationary blade 31, and reference numerals 33 and 34 denote a front end portion and a rear end portion thereof, respectively. Reference numeral 35 denotes a cavity disposed below the shroud 32, reference numeral 36 denotes a seal box, and reference numerals 37 and 38 denote spaces formed between the adjacent moving blades 21 in a front and rear direction, and these spaces are under high pressure due to sealing air flowing out from the cavity 35 and the seal box 36, etc.

In the gas turbine having the structure described above, the high temperature combustion gas 50 flows through a combustion gas passage formed by the moving blade 21 and the stationary blade 31 and causes the moving blade 21 to rotate in order to drive the gas turbine. During operation of the turbine, sealing air flows into the cavity 35 from the inner portion of the stationary blade 21 through a passage (not shown), thereby increasing the pressue in cavity 35 to a high pressure, so that the high temperature combustion gas 50 is prevented from entering the blade from the combustion gas passage.

At this time, the sealing air flows out in an upward direction from between the end portion 33 of the inside shroud 32 of the stationary blade 31 and the end portion 25 of the platform 22 of the moving blade 21, and between the end portion 34 of the inside shroud 32 and the end portion 24 of the platform 22, respectively. As shown by an arrow 40, the sealing air flows in a substantially perpendicular direction relative to the combustion gas 50 which flows in an axial direction, thereby increasing flow resistance of the combustion gas 50.

As mentioned above, in the conventional gas turbine, the sealing air 40 flows out from between the shroud of the stationary blade and the platform of the adjacent moving blade in a direction substantially perpendicular to the flow of the combustion gas 50 thereby increasing the flow resistance of the combustion gas 50, and resulting in deteriorated performance of the turbine.

SUMMARY OF THE INVENTION

Accordingly, an object of the present invention is to provide a gas turbine shroud and platform seal system in which a flow passage for sealing air flowing out from between a shroud of a stationary blade and a platform of an adjacent moving blade is improved so that the sealing air does not easily flow out, and the direction of flow is changed so as not to inhibit or prevent the combustion gas from flowing, thereby improving performance of the turbine.

The present invention provides the following structure in order to achieve the object mentioned above.

A gas turbine shroud and platform seal system, according to the present invention comprises a platform associated with a rotor so as to fix a moving blade and an inside shroud fixed to a stationary blade so as to maintain a predetermined space in an axial direction of the platform and to be adjacently disposed to the platform via a seal apparatus. The space forms a flow passage for air leaking from the seal apparatus. The passage for air is formed in such a manner as to extend back and forth in a zigzag manner in the axial direction so as to be communicated with a combustion gas passage. The passage is further formed in such a manner as to cause leaking air in front of the platform and leaking air at a rear of the platform to flow along a surface of the platform and along a surface of the shroud, respectively. Accordingly, the leaking air flows out into the combustion gas passage in the same flow direction as that of the combustion gas.

In accordance with the present invention, the sealing air leaking from between the platform and the shroud flows in the axial direction from the lower portion of the space so as to flow in from the terminal end of the seal apparatus. The air then flows upwardly after flowing out of the seal apparatus and further flows into the combustion gas passage through the flow passage formed in a zigzag manner so as to flow in a horizontal direction. The leaking air flowing toward the combustion gas passage flows along the surface of the platform in a front portion of the platform, and flows along the surface of the adjacent shroud in a rear portion of the platform, respectively, thereby flowing in the same flow direction as that of the combustion gas.

Thus, since the leaking air does not disturb the flow of the combustion gas, the leaking air flows out in the same direction as that of the combustion gas, and an aerodynamic loss in the gas turbine can be reduced.

Further, since the leaking air flows along the surfaces of the shroud and platform, a temperature increase due to high temperature gas on these surfaces is suppressed by a film cooling effect, so that a cooling effect can be realized.

Still further, the leaking air flows out in a zigzag or serpentine manner, and thus the flow resistance is increased and the air is not easily leaked. Accordingly, the amount of the leaking air is reduced, so that the performance of the gas turbine is also improved.

DETAILED DESCRIPTION OF THE PREFERRED EMBODIMENT

Figure 1:
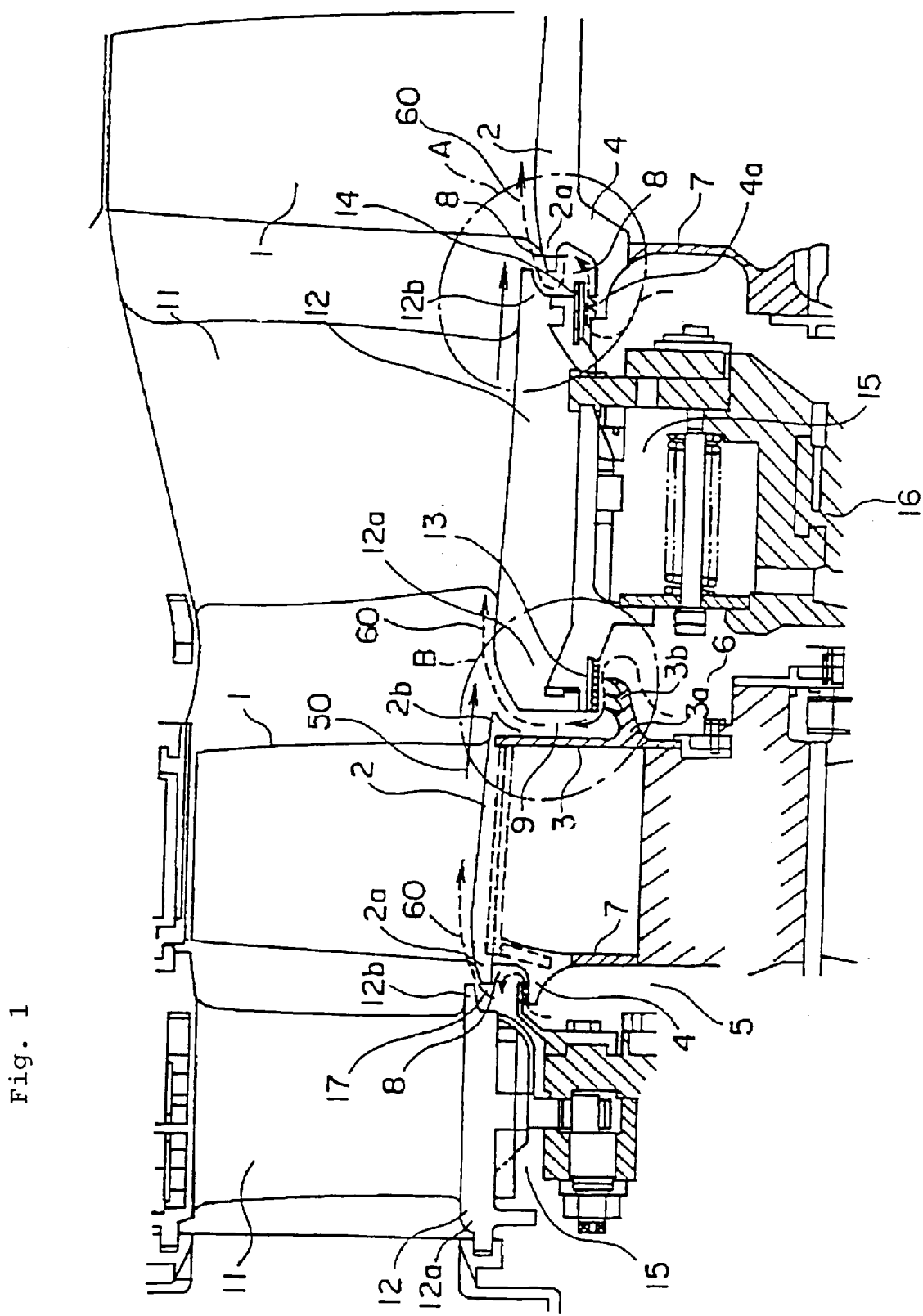
FIG. 1 is a cross sectional view which shows a gas turbine shroud and platform seal system in accordance with an embodiment of the present invention.

An embodiment constructed in accordance with the present invention will be described below with reference to the drawings. FIG. 1 is a cross sectional view which shows a gas turbine shroud and platform seal system in accordance with an embodiment of the invention, FIG. 2 is a view which shows the details of portion A in FIG. 1, and FIG. 3 is a view which shows the details of portion B in FIG. 1.

In FIG. 1, reference numeral 1 denotes a moving blade, and reference numeral 2 denotes a platform thereof, which has upstream and downstream end portions 2a and 2b. Reference numeral 3 denotes a seal plate at a rear or downstream side lower portion of the platform 2, and the seal plate 3 is integrally constructed with an arm portion 3a and a seal fin 3b. Reference numeral 4 denotes a projecting portion at a front or upstream side of the platform 2, which is provided with a seal fin 4a at a terminal end thereof. Reference numerals 5 and 6 denote a front space and a rear space, respectively, with respect to the adjacent stationary blade. Reference numeral 7 denotes a front or upstream seal plate, and reference numeral 8 denotes a space formed by the end portion 2a of the platform 2 and the projecting portion 4.

Reference numeral 11 denotes a stationary blade, and reference numeral 12 denotes an inside shroud thereof. The shroud 12 has end portions 12a and 12b which are described below. Reference numeral 13 denotes a front honeycomb seal, and reference numeral 14 denotes a rear honeycomb seal, in which the seal fin 3b and the seal fin 4a of the adjacent moving blades 1 are arranged in an opposing manner to each other. Reference numeral 15 denotes a cavity, and reference numeral 16 denotes a seal box.

Figure 2:
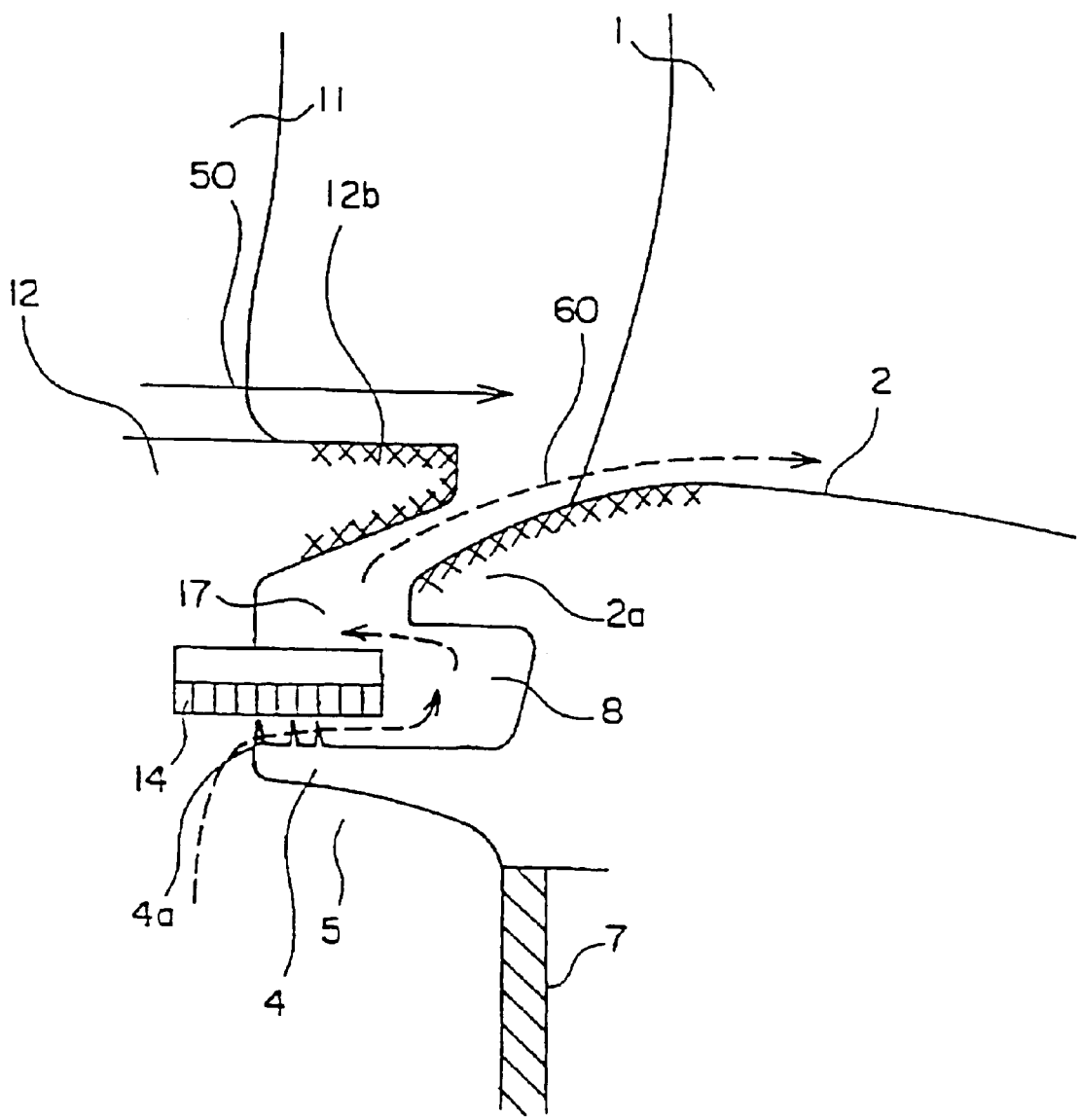
FIG. 2 is a view which shows the details of portion A in FIG. 1.
Figure 3:
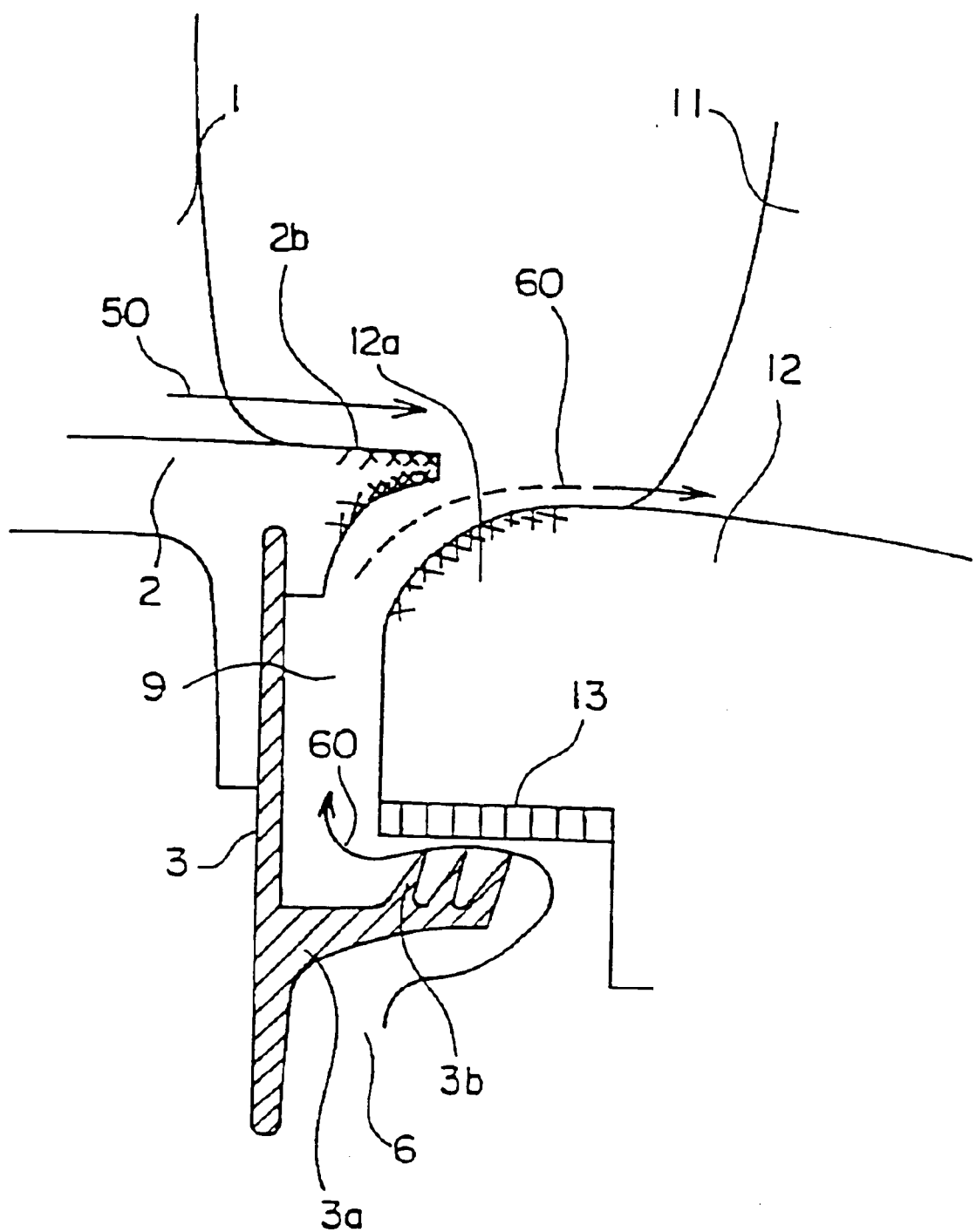
FIG. 3 is a view which shows the details of portion B in FIG. 1.
Figure 4:
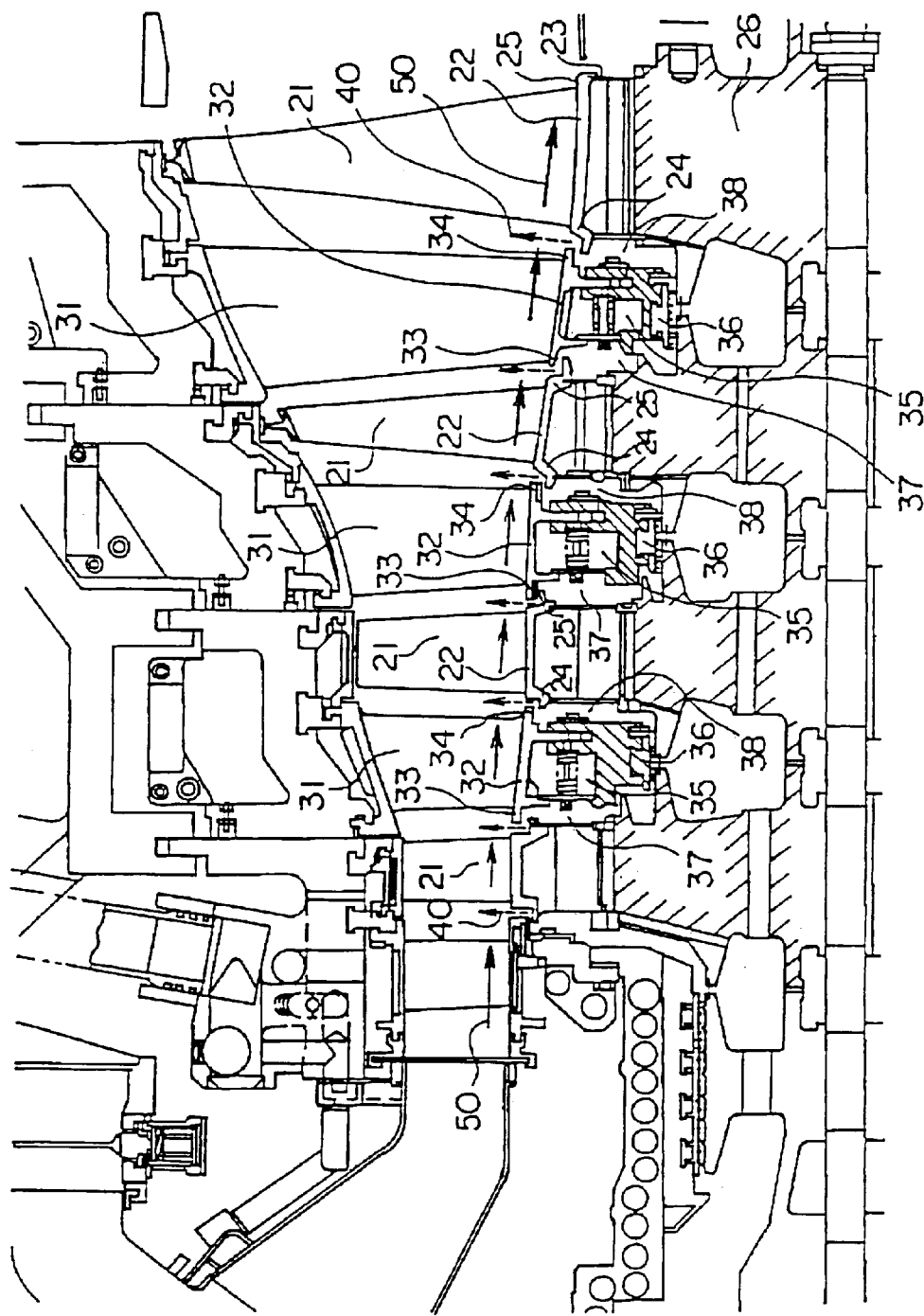
FIG. 4 is a cross sectional view which shows a stationary blade and a moving blade in a conventional gas turbine.

FIG. 2 shows the details of portion A in FIG. 1, and the end portion 12b at the rear of the inside shroud 12 of the stationary blade 11. The end portion 12b is structured such that the honeycomb seal 14 disposed in the lower portion thereof projects so as to form a space 17 together with the honeycomb seal 14. Further, the end portion 2a of the platform 2 of the moving blade 1 projects with a smooth curved surface into the space 17 so that the spaces 17 and 8 form a tortuous or complicated zigzag path of S shape as shown in the drawing between the shroud 12 and the platform 2.

In accordance with the structure mentioned above, lealking air 60 passes horizontally or in a downstream direction between the honeycomb seal 14 and the seal fin 4a from the lower front space 5, the air then changes its direction of flow upward in the space 8. The leaking air 60 further flows horizontally in the upstream direction in the space 17. Thus, the air flows in a zigzag or S-shaped pattern along a space between the shroud end portion 12b and the platform end portion 2. Finally, the air flows out into the gas combustion passage in the same flow direction as that of the combustion gas 50 along the smooth curved surface of the platform 2.

FIG. 3 shows the details of portion B in FIG. 1, in which the end portion 2b of the platform 2 of the moving blade 1 is projected in a downstream direction. A smooth curved surface is formed in the lower surface of end portion 2b. Further, the shroud end portion 12a of the stationary blade 11 is also projected in a direction towards the lower curved surface of the platform end portion 2b of the moving blade 1. The seal plate 3, which includes the arm portion 3a, is provided in such a manner that the seal fin 3b is horizontally arranged below the lower surface of a honeycomb seal 13 of the shroud end portion 12a, and the seal plate 3 is mounted to the lower portion of the platform 2 of the moving blade 1. As mentioned above, a flow passage formed by the space 6 and the space 9 extend in a zigzag or S-shaped pattern, and is formed by the platform end portion 2b, the shroud end portion 12a and the arm portion 3a of the seal plate 3.

In accordance with the structure described above, the leaking air 60 passes horizontally between the honeycomb seal 13 and the seal fin 3b from the lower space 6, and changes its direction upwardly in the space 9. The air then flows upward along the lower curved surface of the platform end portion 2b and the curved surface of the shroud end portion 12a so as to gradually flow in the direction of the combustion gas flow, and thus the air eventually flows out along the surface of the shroud 12.

In the gas turbine having the structure described above, the high temperature combustion gas 50 flows through the combustion gas passage formed by the moving blade 1 and the stationary blade 11 so as to rotate the moving blade 1 and drive the gas turbine. During operation of the turbine, the sealing air flows into the cavity 15 of the stationary blade 11 after passing through a passage (not shown) from the stationary blade 11 so as to increase the pressure in cavity 15, so that it is under high pressure, thereby preventing the high temperature combustion gas from entering into the blade from the combustion gas passage.

At this time, in the front portion of the platform 2, as shown in FIG. 2, leaking air 60 passes between the honeycomb seal 14 and the seal fin 4a, and then passes through the space 8 and the space 17 formed by the platform end portion 2a and the shroud end portion 12b. The air then passes in a zigzag or S-shaped pattern so as to flow out along the curved surface of the platform 2 in the same flow direction as that of the combustion gas 50.

Further, in the rear portion of the platform 2, as shown in FIG. 3, the leaking air 60 passes between the honeycomb seal 13 and the seal fin 3b, and passes through the space 9 formed by the shroud end portion 12a and the platform end portion 2b. The air then flows out along the curved surface of the shroud 12 from the curved surface of the shroud end portion 12a, and then the air flows out in the same flow direction as that of the combustion gas 50. The pattern of the flow, in the rear portion of the platform 2, follows a zigzag or S-shaped path.

In the gas turbine seal system with respect to the stationary blade shroud and the moving blade platform in accordance with the embodiment described above, since the leaking air 60 flows in the same direction as that of the combustion gas 50, the flow of the combustion gas 50 is not disturbed, so that aerodynamic loss can be substantially prevented or reduced.

Further, since the leaking air 60 flows along the surface of the platform 2 of the moving blade 1 and the surface of the shroud 12 of the stationary blade 11, the temperature increase due to the high temperature combustion gas can be suppressed by the film cooling effect, so that an increased cooling effect can be realized. Still further, the leaking air 60 flows out along the passage which is structured in a zigzag manner or S-shaped pattern and in a bent or curved manner, and thereby the resistance to flow is increased, which results in a reduction in the amount of leaking air.

What is claimed is:

1. A gas turbine shroud and platform seal system comprising:
   a rotor extending in an axial direction;
   a moving blade disposed in a combustion gas passage and having a platform secured on said rotor, said platform having an upstream end portion defining a smooth curved surface and a downstream end portion defining a lower curved surface;
   a first inside shroud fixed to a first stationary blade, said first inside shroud being disposed upstream and adjacent to said platform so as to form a first space between a downstream side of said first inside shroud and an upstream side of said platform, said first inside shroud having a downstream portion which overlies said upstream end portion of said platform;

a second inside shroud fixed to a second stationary blade, said second inside shroud being disposed downstream and adjacent to said platform so as to form a second space between an upstream side of said second inside shroud and a downstream side of said platform, said second inside shroud having an upstream portion which has a smooth curved surface and projects under said lower curved surface of said platform;

a first seal structure disposed between said moving blade and said first inside shroud in said first space; and a second seal structure disposed between said moving blade and said second inside shroud in said second space, wherein said first space defines a first flow passage for air leaking from said first seal structure, and said first flow passage communicates with the combustion gas passage and extends back and forth in a zigzag manner along the axial direction of said rotor, wherein said first flow passage is formed so that air flowing through said first flow passage is directed to flow along said smooth curved surface of said platform and in a flow direction which is the same as the direction of combustion gas flowing through the combustion gas passage, wherein said second space defines a second flow passage for air leaking from said second seal structure, and said second flow passage communicates with the combustion gas passage and extends back and forth in a zigzag manner along the axial direction of said rotor, and wherein said second flow passage is formed so that air flowing through said second flow passage is directed to flow along said smooth curved surface of said second inside shroud and in a flow direction which is the same as the direction of combustion gas flowing through the combustion gas passage.

2. A gas turbine shroud and platform seal system as claimed in claim 1, wherein said first seal structure comprises a first honeycomb seal connected to said first inside shroud, and a lower platform projecting portion provided with seal fins directed toward said first honeycomb seal.

3. A gas turbine shroud and platform seal system as claimed in claim 2, wherein said second seal structure comprises a second honeycomb seal connected to a lower surface of said upstream portion of said second inside shroud, and a seal plate connected to said platform, said seal plate having a projecting portion which includes seal fins directed toward said second honeycomb seal.

4. A gas turbine shroud and platform seal system as claimed in claim 1, wherein said smooth curved surface of said second inside shroud opposes said lower curved surface of said platform so as to form a curved flow passage portion at which the direction of air flow transitions from a radially outward direction to the axial direction.

\* \* \* \* \*